United States Patent
Adachi

(10) Patent No.: US 12,146,844 B2
(45) Date of Patent: Nov. 19, 2024

(54) MATERIAL SPECIES IDENTIFICATION SYSTEM USING MATERIAL SPECTRAL DATA

(71) Applicant: TOYOTA JIDOSHA KABUSHIKI KAISHA, Toyota (JP)

(72) Inventor: Masaki Adachi, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 17/868,283

(22) Filed: Jul. 19, 2022

(65) Prior Publication Data
US 2023/0117375 A1  Apr. 20, 2023

(30) Foreign Application Priority Data

Oct. 14, 2021 (JP) .................................. 2021-169174

(51) Int. Cl.
*G01N 23/20* (2018.01)
*G06N 3/08* (2023.01)

(52) U.S. Cl.
CPC .............. *G01N 23/20* (2013.01); *G06N 3/08* (2013.01); *G01N 2223/056* (2013.01); *G06F 2218/12* (2023.01)

(58) Field of Classification Search
None
See application file for complete search history.

(56) References Cited

U.S. PATENT DOCUMENTS

| 11,913,877 B2 | 2/2024 | Nagamori et al. |
| 2019/0017374 A1* | 1/2019 | Misra ................... G01V 3/32 |

(Continued)

FOREIGN PATENT DOCUMENTS

| JP | 2021-92467 A | 6/2021 |
| WO | 2019/039313 A1 | 2/2019 |
| WO | 2021/191421 A1 | 9/2021 |

OTHER PUBLICATIONS

Felipe Oviedo et al., "Fast and interpretable classifications of small X-ray diffraction datasets using data augmentation and deep neural networks", Nature Partner Journals, May 17, 2019, pp. 1-9, vol. 60.

(Continued)

*Primary Examiner* — Raul J Rios Russo
*Assistant Examiner* — Carl F. R. Tchatchouang
(74) *Attorney, Agent, or Firm* — Sughrue Mion, PLLC

(57) ABSTRACT

A system of collating a spectral data of an arbitrary material with spectral data of existing materials to identify the kind of the arbitrary material comprises a one-dimensional CNN processor calculating a characteristic value vector based on a spectral data of a material by a one-dimensional convolution neural network algorithm, and a metric learning processor computing a probability that the kind of the material is each kind of the existing materials from the characteristic value vector by a deep metric learning algorithm. The processors learn with the spectral data of existing materials to compute a probability for the kind of each material such that the probabilities for the kinds of the respective materials inputted for data for learning becomes maximum. When the data of the arbitrary material is inputted, the kind giving the maximum probability is identified as the kind of the arbitrary material with high precision.

8 Claims, 3 Drawing Sheets

(56) References Cited

U.S. PATENT DOCUMENTS

2020/0268252 A1* 8/2020 Litvinova ............. G01J 3/4406
2021/0182734 A1   6/2021 Yano et al.
2021/0390279 A1* 12/2021 Siganos ................ G06F 18/214

OTHER PUBLICATIONS

Hao Wang et al., "CosFace: Large Margin Cosine Loss for Deep Face Recognition" CVPR, 2018, pp. 5265-5274.
Xiao Zhang et al., "AdaCos: Adaptively Scaling Cosine Logits for Effectively Learning Deep Face Representations", CVPR, 2019, 11pgs.
Ilija Radosavovic et al., "Designing Network Design Spaces", CVPR, 2020, pp. 1-12.
Katsuhiro Nakai et al., "Preliminary study of liver cirrhosis staging and classification using deep metric learning network", $35^{th}$ National Conference of the Japanese Society for Artificial Intelligence, 2021, Japan, Japanese Society for Artificial Intelligence, Jun. 8, 2021 (6 pages total).

* cited by examiner

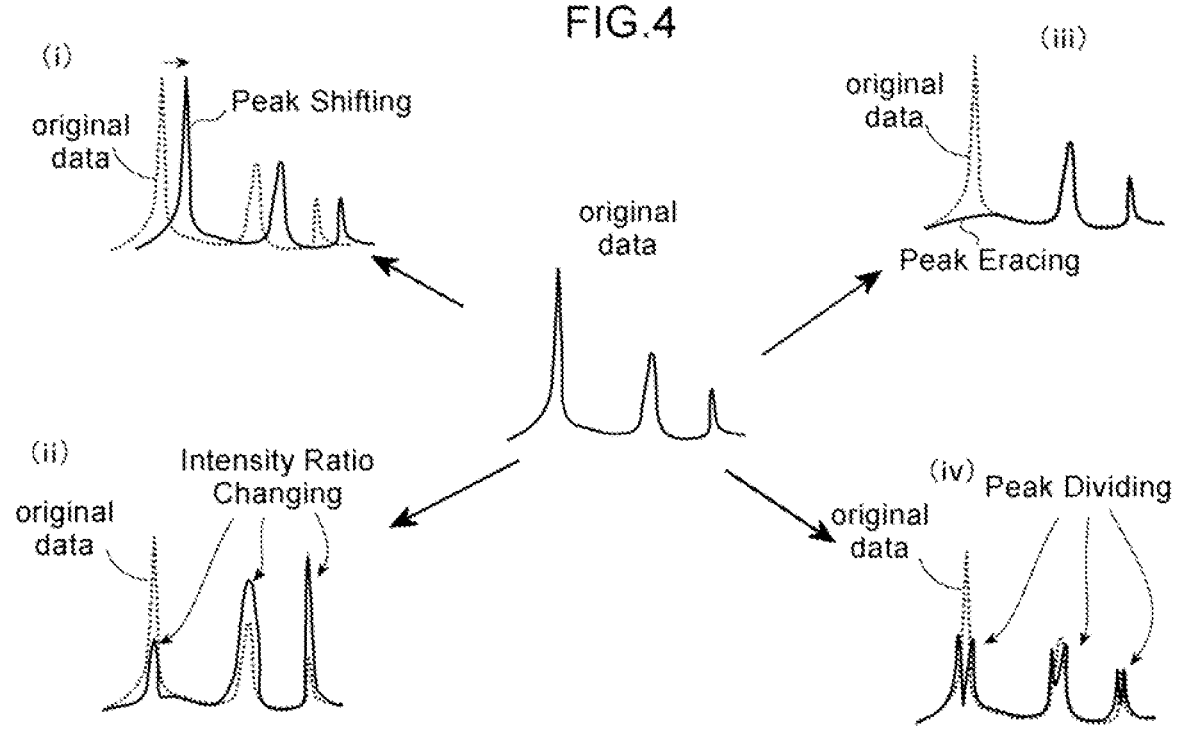

MATERIAL SPECIES IDENTIFICATION SYSTEM USING MATERIAL SPECTRAL DATA

CROSS-REFERENCE TO RELATED APPLICATION

This application claims priority to Japanese Patent Application No. 2021-169174 filed on Oct. 14, 2021, which is incorporated herein by reference in its entirety including the specification, drawings, and abstract.

TECHNICAL FIELD

The present embodiment relates to a technique for analyzing spectral data obtained from various materials, more specifically to a system of identifying kinds of arbitrary materials through comparing spectral data of an arbitrary material obtained by powder x-ray diffraction, infrared spectroscopy, etc. with spectral data of known materials recorded in a spectrum database using machine learning technology. Spectral data of materials may be arbitrary spectral data in which spectral intensity values are measured to an arbitrary one-dimensional variable, which may be full spectra or line spectra, and concretely, those may also be a mass spectrum, an NMR spectrum, an absorbance spectrum, an emission spectrum, etc., other than a powder x-ray diffraction spectrum or an infrared spectroscopic spectrum, and such cases belong to the scope of the present embodiment.

BACKGROUND ART

In identification of any material, the spectral data of the material is measured by an arbitrary measurement method and collated with spectral data of known materials. In such collation of spectral data of the material to be identified with the data of known materials, since now there are a huge number of the spectral data of known materials and thus the collation of the spectral data by human requires extremely much time, labor and expense, there have been made various attempts to perform collation of the spectral data of materials automatically by computer, using machine learning techniques or Artificial Intelligence (AI) techniques. For instance, in Japanese Laid-open Publication No. 2021-92467, there is proposed a system in which characteristic values are extracted from an x-ray diffraction spectral data obtained from any material and, based upon the characteristic values, the material is identified by using a machine learning model which has been learned to be capable of sorting out a diffraction pattern with high similarity to the tested pattern from diffraction patterns of known materials. Further, F. Oviedo et al. ("Fast and interpretable classification of small X-ray diffraction datasets using data augmentation and deep neural networks", npj Computational Materials volume 5, Article number: 60 (2019)) has reported that the validities of some machine learning algorithms for a problem to identify the number of dimensions and space group of a crystal structure of a material from the x-ray diffraction spectral data of the material are tested, and an identifier using one-dimensional a-CNN (all convolutional neural network) can precisely identify the number of dimensions and space group of a crystal structure. In this document, it has been reported that, by using, as data for learning in the learning stage of a-CNN, existing data of x-ray diffraction spectra of various materials and the data which are created by adding artificial random variations to the existing data of the respective materials according to a method called as "physics-informed data augmentation", there can be constructed an identifier which can achieve the identification at high precision of the number of dimensions and the space group of a crystal structure from its spectral data even when only one or two x-ray diffraction spectral data are available for the respective materials in the existing data.

In this connection, as a machine learning technique for achieving the classification of a huge number of classes with sufficient accuracy, there has been proposed a technique referred to as "deep metric learning". With respect to this deep metric learning, various algorithms, named such as CosFace, ArcFace, AdaFace, etc., have been devised for performing the recognition of many person's faces (see H. Wang et al., "Cosface: Large margin cosine loss for deep face recognition", In CVPR (2018) URL https://arxiv.org/abs/1801.09414; X. Zhang, et al., "Adacos: Adaptively scaling cosine logits for effectively learning deep face representations" In CVPR(2019) URL httPs://arxiv.org/abs/1905.00292). In those algorithms, a characteristic value vector of an image obtained from CNN (convolutional neural network) of a two-dimensional image is inputted into the algorithm of a deep metric learning as mentioned above, and it has been reported that the identification and classification of individual facial images were achieved with higher precision than the case of using only the CNN.

SUMMARY

In a case of constructing an identifier which identifies and classifies the kind of a material from spectral data using a machine learning technique, as in the above-mentioned documents, for the purpose of collating the spectral data of a material of which kind is to be identified (unidentified material) with existing data of known materials to identify the kind of the unidentified material, since the number of kinds of known materials is huge as already noted, the number of classes which the identifier should classify is huge. For instance, the number of the kinds of materials registered in the Inorganic Crystal Structure Database (ICSD) offered by the National Institute of Standards and Technology, etc. reaches to 136899 kinds in 2021. Thus, to make it possible to identify all the materials from the x-ray diffraction data, the number of classes which should be classified in the identifier into which x-ray diffraction data are inputted will also be the number of kinds registered in the database. In this respect, also in the spectral data of materials, similarly to human's faces, different materials can have features similar to one another, and it is difficult to identify with sufficient accuracy the kinds of such mutually different materials having spectral data with such similar features. Indeed, in the research by the inventor of the present embodiment, expected accuracy was not achieved in trials of identification of material kinds by a standard one-dimensional CNN using X-ray diffraction data of materials registered in ICSD.

Then, the inventor of the present embodiment variously studied about the structure of an identifier which can classify the kinds of materials from the spectral data of materials with high precision, aiming at identification of the kind of an unidentified material, and it has been found that, by composing as an identifier the structure that inputs the spectral data into one-dimensional CNN; further inputs the characteristic value vector of the spectral data obtained therefrom into a structure of the deep metric learning proposed for the recognition of human's faces as described above: and performs classification of the kinds of materials, and performing the learning of the identifier of this structure using the spectral data of known materials as data for learning, the kind of a material can be identified from the spectral data of the material with higher precision as compared with the prior art. Furthermore, it has also been found that, in the above-mentioned case, by using, as data for learning, the spectral data of known materials (known data) and data created by adding variations to the known data in accordance with a method called the "physics-based data augmentation" as explained in detail later, the accuracy of the identification is improved. Moreover, it has also been found that, in the structure of the deep metric learning of the identifier, by employing a structure which performs the algorithm of deep metric learning twice in succession (Referred to as "hierarchical metric learning".), the accuracy of the identification is further improved. These knowledges are used in the present embodiment.

Thus, one object of the present embodiment is to provide a material kind identification system which can identify the kind of an arbitrary material by collating the spectral data of the arbitrary material with the spectral data of known materials.

Further, another object of the present embodiment is to provide such a system as described above which has, as an identifier, a structure which is capable of classification of spectral data with higher precision than a structure using a standard one-dimensional CNN.

According to the present embodiment, the above-mentioned object is achieved by a system of identifying a kind of a material from a spectral data of the material, comprising:

one-dimensional CNN processor, having a data input layer into which the spectral data of the material is inputted and a vector output layer which outputs a characteristic value vector of a predetermined number of dimensions, which processor is inputted with the spectral data at data input layer and then outputs at the vector output layer the characteristic value vector, corresponding to the spectral data, which is obtained by calculation based on the spectral data by a one dimensional convolution neural network algorithm; and a metric learning processor, having a vector input layer into which the characteristic value vector is inputted and a probability output layer which outputs probabilities of kinds of various materials, which processor is inputted with the characteristic value vector at the vector input layer and then calculates, based on the characteristic value vector by a deep metric learning algorithm, the probabilities of the kinds of the various materials that the kind of the material of the spectral data corresponding to the characteristic value vector is each of the kinds of the various materials, and outputs the probabilities at the probability output layer;

wherein, using spectral data of two or more known materials whose kinds are known as data for learning, the one-dimensional CNN processor and the metric learning processor learn such that, when each of the data for learning is inputted into the data input layer of the one-dimensional CNN processor, a probability of the kind of the material of the inputted data for learning at the probability output layer of the metric learning processor becomes a maximum value of the probabilities; and wherein a kind of a material for which the maximum probability value is obtained at the probability output layer of the metric learning processor when a spectral data of an arbitrary material is inputted into the data input layer of the one-dimensional CNN processor, is identified to be the kind of the arbitrary material.

In the above-mentioned structure, the spectral data of materials may be any data in which the intensity is measured to an arbitrary one-dimensional variable, such as a powder x-ray diffraction spectrum, an infrared spectroscopic spectrum, a mass spectrum, an NMR spectrum, an absorbance spectrum, an emission spectrum, etc., obtained from an arbitrary material. The material may be an arbitrary inorganic or organic matter.

"The algorithm of one dimensional convolution neural network" in the "one-dimensional CNN processor" may be an algorithm which employs, as input data, data in which values, such as intensity values, brightness values, etc., are given along one-dimensional variable, like one-dimensional spectral data, and performs calculation by the algorithm of the convolutional neural network(CNN). Concretely, in the input layer of the one-dimensional CNN processor, the spectrum value at every predetermined variable interval, which may be set arbitrarily, in the spectral data is assigned to one neuron (perceptron). For example, in a case of x-ray diffraction data, an intensity value at every predetermined angle is inputted into one neuron of the input layer (Thus, in a case of a structure of giving an intensity value at every 0.02 degree in the range of 0 to 120 degrees to one neuron, 6000 neurons are prepared for the input layer.). In this regard, usually in CNN, an identification result or a numerical result value of a regression calculation is outputted at the final output layer. However, in the present embodiment, as noted above, since the characteristic value vector of a predetermined dimensions, e.g. 1024 dimensions, which may be set arbitrarily, is used for the subsequent calculation, the output layer is composed of neurons of the predetermined number of dimensions, and the characteristic value vector is composed of the output values of the respective neurons as its vector elements (Namely, the calculation of the neural network in the present embodiment is performed by a stage before the output stage of identification or regression in usual cases.). According to the research of the inventor of the present embodiment, it has been found that the algorithm of 1D-RegNet (I. Radosavovic, et al., "Designing network design spaces" CVPR 2020 https://arxiv.org/pdf/2003.13678.pdf) is advantageously used an algorithm of one-dimensional CNN for the purpose of the present embodiment.

The algorithm of the "deep metric learning" in the "metric learning processor" may be the same as those of the deep metric learning technique (AdaCos, CosFace, ArcFace, SphereFace, etc.) as described in H. Wang et al. and X. Zhang, et al. The deep metric learning technique is a technique advantageous to solving a classification problem, and briefly speaking, in this technique, a weight vector is learned such that, in a case that a cosine similarity between a characteristic value vector obtained from the CNN calculation and the weight vector is calculated and the characteristic value vector is mapped on a multi-dimensional spherical surface, the distance between the mapping points of characteristic value vectors on the spherical surface becomes larger as the difference in the features of the data corresponding to the characteristic value vectors becomes larger, and then, using the cosine similarity between the characteristic value vector and weight vector, the probability that the data corresponding to the characteristic value vector is classified into each class is computed. In the case of the present embodiment, as noted above, the metric learning processor is configured such that, when a characteristic value vector computed from a spectral data of a material in the one-dimensional CNN processor is inputted to the metric learning processor, it computes out a probability that the kind of the material of the data corresponding to the characteristic value vector is each of the kinds of various materials according to an algorithm of a deep metric learning as described above.

Moreover, the learning processes of the one-dimensional CNN processor and metric learning processor, namely, the calculation processes for determining weight parameters used in the calculation in those processors are performed using spectral data of known materials of which kinds are known as data for learning. For the spectral data of known materials, data registered or saved in an arbitrary database may be used. For instance, in a case of identifying a kind of a material from x-ray diffraction data of an inorganic matter, the spectral data of known materials may be those registered into ICSD, etc. The learning of the above-mentioned processors may be performed in accordance with an arbitrary algorithm, such as the algorithm of the backpropagation method, such that, when each of data for learning is inputted into the data input layer of the one-dimensional CNN processor, the probability for the kind of the material of the corresponding one of the data for learning at the probability output layer of the metric learning processor becomes the maximum.

Then, in the metric learning processor, the kind for which the maximum probability value is obtained for the spectral data of an arbitrary material is identified as the kind of the arbitrary material.

In the structure of the material kind identification system of the present embodiment described above, briefly, the algorithm of one-dimensional CNN is connected with the algorithm of deep metric learning, and thereby, the spectral data of an arbitrary material is collated with the spectral data of various known materials so that the kind of the arbitrary material will be identified at high precision. As already noted, in the identification of a kind of a material, the number of the kinds, i.e., classes to be identified is huge, and therefore, the identification of the kind was not able to be achieved with sufficient accuracy only by a standard CNN. Then, in the present embodiment, it has been found that, through connecting the deep metric learning technique to the CNN, it is made possible to distinguish similar data and dissimilar data more clearly, allowing the identification of the kind of an arbitrary material successfully.

In the above-mentioned structure, the metric learning processor may be configured to compute out the probability of each kind in the kinds of various materials based on a characteristic value vector by the algorithm of "hierarchical metric learning" which performs the algorithm of deep metric learning twice in succession. In the algorithm of the "hierarchical metric learning", as noted above, after converting the characteristic value vector outputted from one-dimensional CNN by the algorithm of the deep metric learning at least twice, the probability that the data corresponding to the characteristic value vector is classified into each class (a kind of a material in the present embodiment) is computed. More concretely, in the algorithm of the hierarchical metric learning, in a case of a structure that the algorithm of the deep metric learning is continued twice, when a characteristic value vector is inputted into a processor performing the first deep metric learning, the characteristic value vector is converted by the operation according to the algorithm of the first deep metric learning so that the second characteristic value vector of a predetermined dimensions, which may be set arbitrarily, will be computed. This second characteristic value vector may be logits used to calculate a probability in a case of a structure of computing the probability of each class by the algorithm of the first deep metric learning. Then, the second characteristic value vector (logits in the algorithm of the first deep metric learning) is further inputted into a processor performing the algorithm of the second deep metric learning, where the process of further converting the second characteristic value vector by the operation according to the algorithm of the deep metric learning is performed, and then from the obtained characteristic value vector, i.e., the logits in the algorithm of the second deep metric learning, the probabilities of the respective classes are computed. For the computation of the probabilities of the respective classes from the logits, for instance, the softmax function may be used. It has been found that the identification accuracy of the kind of a material is improved by using the algorithm of this hierarchical metric learning.

The algorithm used for the above-mentioned algorithm of the hierarchical metric learning may be an algorithm of an arbitrary deep metric learning, and, concretely, may be chosen from AdaCos, CosFace, ArcFace, SphereFace, etc. As illustrated in the column of Embodiments later, according to the research of the inventor of the present embodiment, it has been found that, by using Ada Cos (X. Zhang, et al.) for the algorithm of the first deep metric learning and Cos Face (H. Wang et al.) for the algorithm of the second deep metric learning in the algorithm of hierarchical metric learning, the identification of the kind of a material can be achieved at higher precision. In that case, in the metric learning processor, the characteristic value vector outputted from the one-dimensional CNN processor may be converted into the logits of AdaCos in accordance with the algorithm of AdaCos: the logits of AdaCos may be further converted into the logits of CosFace in accordance with the algorithm of CosFace; and from the logits of CosFace, the probability of each kind in the kind of various materials may be computed.

In the structure of the above-mentioned system of the present embodiment, the data for learning may include not only the spectral data of known materials but also "extended spectral data", which are created from the spectral data of known materials in accordance with the algorithm of "physics-based data augmentation". In the algorithm of the "physics-based data augmentation", spectral data (extended data) different from the spectral data of known materials (the original data) are generated by virtually and artificially adding various changes which may occur in actual measurements of spectral data, for example, the shift of a variable, such as an angle, frequency, etc. at which a peak appears in data (the shift of a peak position), the change of the intensity ratio among two or more peaks, the disappearance of a peak, the division of a peak, etc., to the spectral data of known materials. Concretely, in the physics-based data augmentation process, the following processes may be performed:

(i) Peak shifting process—A variable at which an observed peak occurs in the spectral data of a known material is shifted at random.

(ii) Peak intensity ratio changing process—The intensity ratio among two or more peaks observed in the spectral data of a known material is changed at random.

(iii) Peak erasing process—A peak observed in the spectral data of a known material is erased at random.

(iv) Peak dividing process—A peak observed in the spectral data of a known material is divided to two or more peaks at random.

(iv) Combination of at least two processes of (i) to (v)

In this regard, a change of various data in each of processes may be performed adaptationally at various degrees in consideration of degrees of changes which may occur in actual measurement data. Further, preferably, in the algorithm of the physics-based data augmentation, the extended data may be generated by performing all of the peak shifting process, peak intensity ratio changing process, peak erasing process and peak dividing process.

When the extended data generated by the algorithm of the above-mentioned physics-based data augmentation are used as the data for learning, the identification accuracy of the kind of a material for the spectral data of an arbitrary material will be further improved. As noted above, in most cases of actual measurement of spectral data, various changes as above occur in data. On the other hands, with respect to spectral data of known materials, the number of the existing spectral data for each material is few (one example or two examples), and so, when the learning of the identifier is performed using only such a small number of data, generally, it will be difficult for the identifier to identify with sufficient accuracy the material of actual measurement data where various changes have occurred. In the other words, in the learning of the identifier, in order to make the identification accuracy higher, it is necessary to prepare as many data as possible for each material and use them as the data for learning. However, since some materials are expensive or rarely available, to prepare many data for various materials by actual measurements would require much time, labor and expense. Thus, in the present embodiment, by adding to the data for learning the data which are generated by adding changes to the spectral data of known materials artificially through the algorithm of the physics-based data augmentation, the improvement in the identification accuracy of the identifier will be achieved.

In this regard, while usually the effect of the improvement in the identification accuracy of the identifier is more expected as the number of the extended data used for the data for learning is larger, it is not necessary to repeat the generation of the extended data and the learning process unnecessarily many times. Thus, in one embodiment, the generation of extended data and the learning process of the one-dimensional CNN processor and metric learning processor using the extended data may be performed until the identification accuracy of the kind of an arbitrary material reaches a predetermined value. Namely, the one-dimensional CNN processor and metric learning processor may be configured by generating different extended data with the algorithm of the physics-based data augmentation, and repetitively performing the learning process of the one-dimensional CNN processor and metric learning processor by means of the different extended data for the data for learning until the identification accuracy of the kind of an arbitrary material reaches a predetermined value.

In the structure of the above-mentioned system of the present embodiment, first, in collation of the spectral data of an arbitrary material with the spectral data of existing materials, robust extraction of a characteristic value and the accurate identification of the kind of the arbitrary material are attained even when there are some differences between the spectral data of the arbitrary material and the existing spectral data because of the use of one-dimensional CNN. In this respect, in prior art, the collation of the spectral data of an arbitrary material with the spectral data of existing materials required the comparison of the data of the arbitrary material with each one of the data registered in the database of the existing materials, one by one. On the other hand, in the system of the present embodiment, because of the use of CNN, such comparison operations become unnecessary and the speed for the identification can increase (Supposing the number of data in a database are m, the speed for the identification will be 1/m.). Furthermore, in the basic structure of the system of the present embodiment, since the algorithm of the deep metric learning used for recognition of faces is employed, it is expected to enable achieving the classification of much larger number of classes successfully than in a case that only a standard one-dimensional CNN is used, and thus, it is expected that the more accurate identification of the kind of the material corresponding to the spectral data of an arbitrary material will be attained.

Other purposes of the present disclosures will become clear by explanations of the following preferable embodiments of the present disclosure.

BRIEF DESCRIPTIONS OF DRAWINGS

Figure 3A:
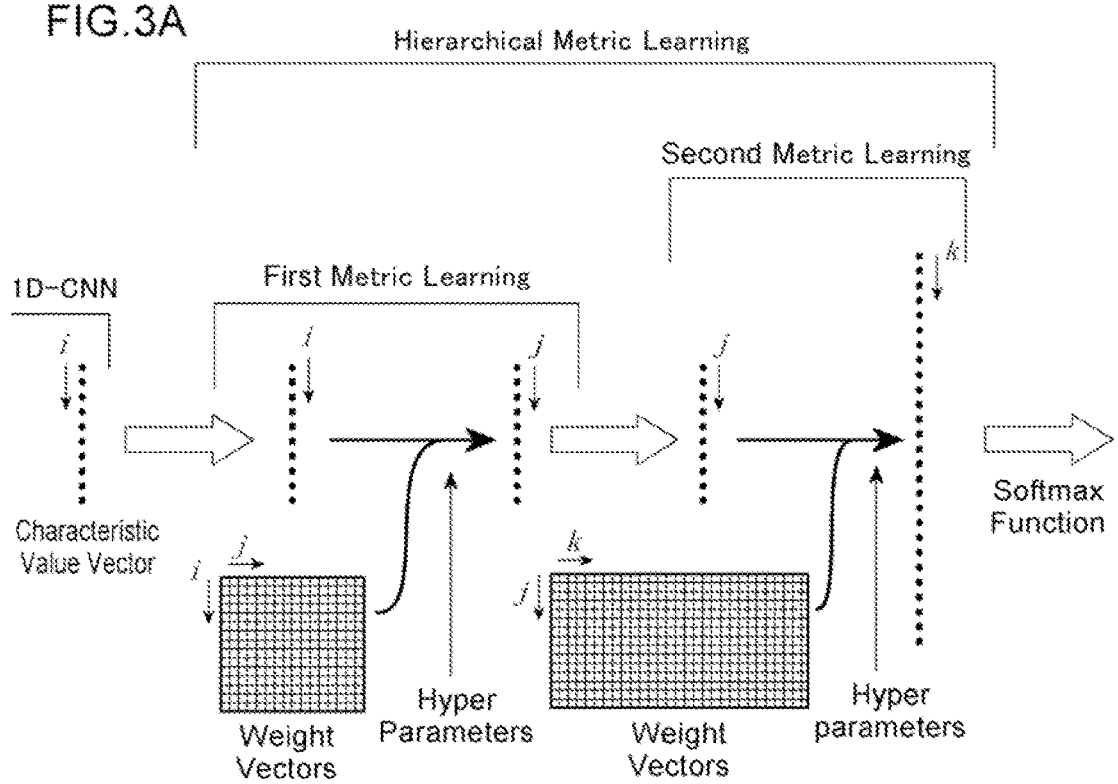
FIG. 3A is a schematic drawing explaining the algorithm of the hierarchical metric learning in the system in accordance with the present embodiment.
Figure 3B:
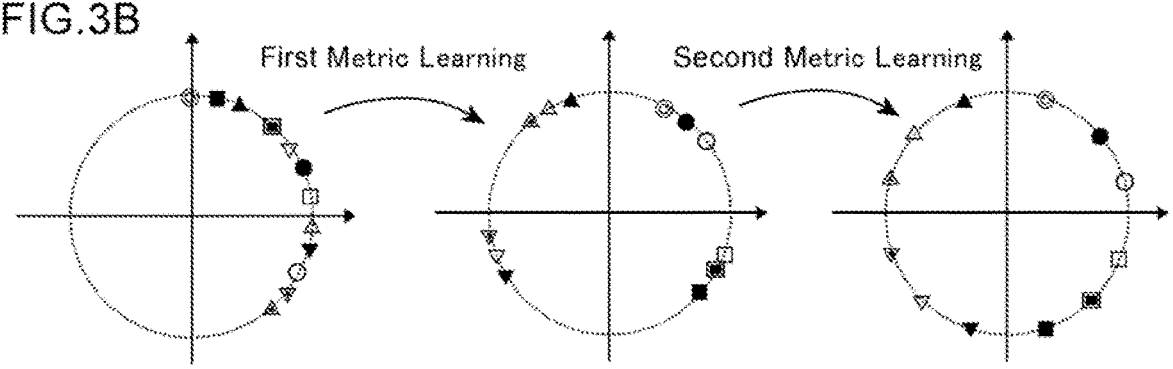

FIG. 3B is diagrams of the concept of the operation by the algorithm of the hierarchical metric learning, depicting that, when characteristic value vectors (respective points on a dotted line circle) obtained from various data by the one-dimensional CNN process are mapped on a virtual spherical surface, the characteristic value vectors are divided into groups of vectors having of mutually similar features by the first metric learning processing, and the distances on the spherical surface between the characteristic value vectors within each group are increased by the second metric learning processing, and thereby, the highly precise classification of materials corresponding to characteristic value vectors is achieved FIG. 4 is a drawing which shows schematically the examples of changes of the data given to an existing spectral data by the algorithm of the physics-based data augmentation in the system of the present embodiment.

DETAILED DESCRIPTION OF EMBODIMENTS

The Structure of Computer Device

Figure 1:
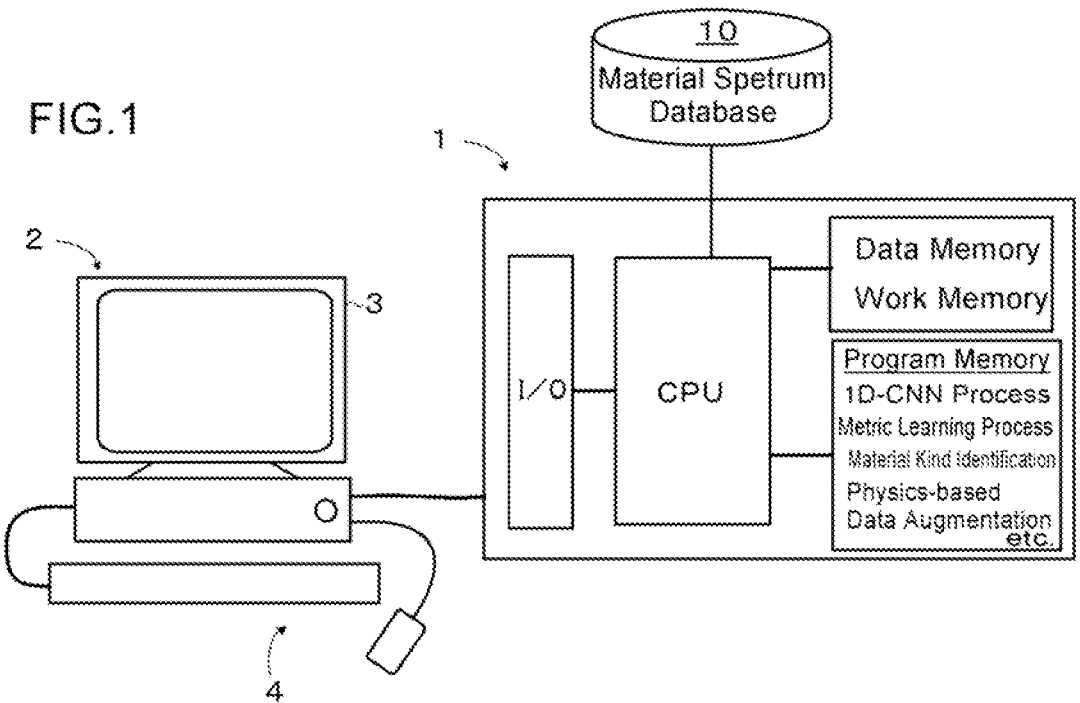
FIG. 1 is a schematic drawing showing a computer in which a material kind identification system using spectral data of a material according to the present embodiment is realized.

The system of identifying a kind of an arbitrary material from spectral data of the arbitrary material in accordance with the present embodiment may be realized by the operations of a computer program in a computer device 1 of the type usually used in this field as illustrated in FIG. 1. The computer device 1 is equipped with a CPU, a memory device and an input/output device (I/O), which are mutually connected by bidirectional common bus in a usual manner, and the memory device includes a memory which has memorized respective programs performing operational processes used in calculations of the present embodiment, a work memory and a data memory which are used in the operations. Further, an instruction of an operator to the computer device 1 and the display and output of calculation results and other information are made through a computer terminal 2 connected to the computer device 1. The computer terminal 2 is equipped with a monitor 3 and input devices 4, such as the, a keyboard, and a mouse, in an usual manner, and when a program is started, the operator becomes able to conduct various instructions and inputs through the input devices 4 to the computer device 1, following a display on the monitor 3 according to the procedure of the program, and visually check a calculation condition, a calculation result, etc. from the computer device 1 on the monitor 3. Furthermore, in the present embodiment, as explained later, while existing spectral data of known materials are used, those existing spectral data may be acquired from an arbitrary database, and thus, the computer device 1 may be capable of accessing an arbitrary database 10 in an arbitrary way. In this regard, it should be understood that the computer device 1 and the computer terminal 2 may be equipped with other peripheral devices, not illustrated (a printer outputting a result, a memory device for outputting and inputting calculation conditions, calculation result information, etc.). In performing various kinds of processes or operations as described below with the computer device 1, a program necessary for various kinds of processes or operations is started in a usual manner, and an operator inputs data necessary for the operations, calculation conditions and other various settings in the operation in the computer terminal 2 according to input procedures prepared in the program, and then, the operation is started. Then, during execution or after the end of the operation, a calculation result can be appropriately outputted through the computer terminal 2.

In the above-mentioned computer device 1, for identifying a kind of a material from spectral data, similarly to an operation process using a usual machine learning technique, briefly, there is performed a learning process (determination of parameters, such as weights, etc. used for operation) using existing data for the data for learning, first, and thereby, the model (identifier) which identifies a kind of a material is configured. Then, a spectral data of an arbitrary material of which kind is wanted to be identified is inputted into the learned identifier, and then the identifier outputs the kind of the material as the identification result. Thus, when performing the learning process, the setting of hyper-parameters used in the calculation, the reading-in of existing data of known materials from a database, etc. are made through the operator's input operation from the input device 4, and the computer device 1 performs the learning process using the read-in existing data as the data for learning in accordance with a program memorized in the program memory. Then, after the completion of the learning process, the spectral data of a material of which the kind is wanted to be identified is inputted by the input operation of the operator from the input devices 4, and the computer device 1 identifies the kind of the material of the inputted spectral data with the learned identifier according to the program memorized in the program memory, and then the result is outputted to the computer terminal 2 and displayed on the monitor, etc.

In the present embodiment, the spectral data of materials, as already noted, may be data in which a spectrum value or an intensity value is measured along an arbitrary one-dimensional variable, such as a powder x-ray diffraction spectrum, an infrared spectroscopic spectrum, a mass spectrum, an NMR spectrum, an absorbance spectrum, an emission spectrum, etc., and the material may be inorganic or organic matters. The existing data of known materials used for data for learning may be data obtained by an arbitrary way (measurements or simulations) or data acquired from an arbitrary database. For instance, for powder x-ray diffraction spectra of inorganic matters, those may be data available from ICSD offered by the National Institute of Standards and Technology, etc.

Basic Structure of Identifier

Figure 2:
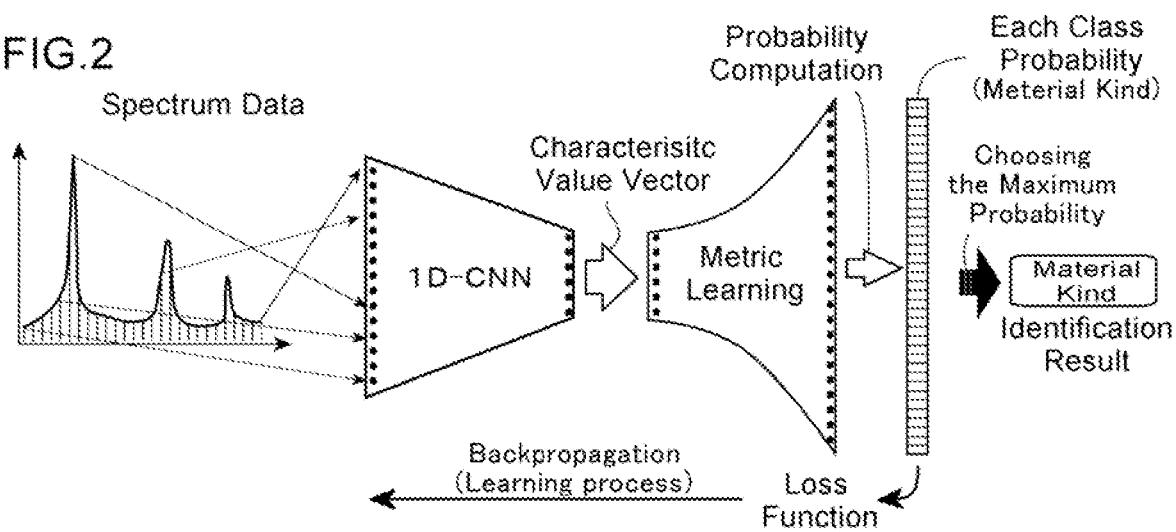
FIG. 2 is a schematic drawing explaining the structure (an identifier) of operation processes for the identification of the kind of a material from the spectral data of the material in the system in accordance with the present embodiment.

Referring to FIG. 2, in the structure of the identifier in the system which identifies a kind of a material from the spectral data of the material according to the present embodiment, basically, there are comprised a one-dimensional CNN processor which is inputted with the spectral data and computes a characteristic value vector therefrom; and a metric learning processor which receives the characteristic value vector from the one-dimensional CNN processor and determines probabilities for respective materials.

The one-dimensional CNN processor may be a calculation processor which realizes the algorithm of one-dimensional CNN in a usual manner. Concretely, the spectrum value (intensity value, brightness value, etc.) for every variable value in the spectral data of a material is inputted into each of plural neurons of an input layer of CNN, and through calculations in a convolution layer, a polling layer and a fully connected layer, a characteristic value vector of a predetermined number of dimensions is computed out at an output layer. For instance, in a case that a spectral data is a powder x-ray diffraction spectrum, in order that the intensity value for every 0.02 degree in the range of 0 to 120 degrees of variable 2θ is given to each neuron, 6000 neurons may be prepared for the input layer. Further, the dimensions of the characteristic value vector at the output layer may be set appropriately. In the case of the above-mentioned example that the 6000 values are given to the input layer, the number of dimensions of the characteristic value vector at the output layer may be, for example, 1024, etc. In this regard, according to the research of the inventor of the present embodiment, it has been found that the algorithm of 1D-RegNet (I. Radosavovic, et al.) is used advantageously for the algorithm of one-dimensional CNN in the present embodiment.

The metric learning processor may be a calculation processor which realizes the algorithm of a deep metric learning technique, referred to as AdaCos, CosFace, ArcFace, SphereFace, etc. as already noted. Concretely, in the metric learning processor, the characteristic value vector outputted by the one-dimensional CNN processor is received; cosine similarity between the characteristic value vector and a weight vector is calculated; logits are computed by using the cosine similarity and a hyper-parameter; and from the logits, for each of classes, the probability that the data corresponding to the characteristic value vector is classified into each class is computed. Here, in the present embodiment, the respective classes into which each data is classified in the metric learning processor are kinds of materials to which the data can correspond. For the calculation from logits to the probability of each class, the softmax function may be typically used, but not limited thereto. Then, in the probabilities for the respective classes, the class which gives the maximum probability is chosen, and the kind of the material of the chosen class is identified as the kind of the material of the inputted spectral data. In this regard, as explained later, in the metric learning processor in the present embodiment, there may be advantageously employed an algorithm of "Hierarchical metric learning" which performs the algorithm of deep metric learning technique at least twice in succession.

The learning of the above-mentioned identifier comprising the one-dimensional CNN processor and metric learning processor, as noted, may be performed with existing data of known materials as the data for learning in the way so-called "End-to-end training". Concretely, for instance, in the performing of a learning process with a certain data for learning, first, a spectral data of the data for learning is inputted into the input layer of the one-dimensional CNN processor while a correct answer label (the probability of the class of the kind of the material corresponding to the inputted data for learning is set to 1 while the probabilities of the other classes are set to 0) is given at the output layer of the metric learning processor which gives the probability of each class and the loss functions are computed at the output layer of the metric learning processor. Then, in accordance with the algorithm of the backpropagation method, the learning in which parameters in the one-dimensional CNN processor and metric learning processor are updated may be performed. Here, typically, the loss function may be Cross-entropy Loss, but not limited thereto. In this regard, since the learning of the identifier is the supervised learning with existing data of known materials as noted above, the classes, i.e., the kinds of materials, which can be classified by the identifier are the kind of known materials.

According to the structure of the above-mentioned present embodiment, by employing the algorithms of one-dimensional CNN and deep metric learning for the identifier which identifies a kind of a material from the spectral data of the material, the ability of identifying data is improved, and it is also expected that it becomes possible to identify the kinds of materials of thousands to hundreds of thousands from data, not only the classification of properties of materials (the number of dimensions, a space group of a crystal, etc.).

Structure of Hierarchical Metric Learning

As noted above, in the metric learning processor of the present embodiment, the algorithm of "Hierarchical metric learning" may be employed, and thereby the further improvement in the ability of identifying a kind of a material from data will be achieved. In the algorithm of the hierarchical metric learning, as already noted, the operation process in accordance with the algorithm of deep metric learning is performed at least twice in succession. Concretely, first, in the algorithm of deep metric learning, usually, the logits of respective classes (k dimensions) are calculated from cosine similarities between the characteristic value vector (i dimensions), outputted by the one-dimensional CNN processor, and weight vectors (of the respective classes), and a hyper-parameter, and the probability of each class is computed by means of the logits. On the other hand, in the case of the hierarchical metric learning, as shown in FIG. 3A, logits (j dimensions) are calculated in the first metric learning processor by using the characteristic value vector (i dimensions) outputted by the one-dimensional CNN processor, and next, the logits are passed to the second metric learning processor, where the logit of the respective classes (k dimensions) are calculated: and then, from these logits, the probability of each class is computed using the softmax function, etc. (When the algorithm of deep metric learning is further continued, the logits are passed to the following metric learning processor.). In this regard, the j dimensions of the logits computed in the first metric learning processor may be set arbitrarily, which may be the same as, or different from, the i dimensions of the characteristic value vector outputted from the one-dimensional CNN processor.

According to the algorithm of the above-mentioned hierarchical metric learning, it is considered that data having a mutually similar feature can be classified in more detail. Referring to the conceptual diagram of FIG. 3B, at a stage where characteristic value vectors of various data, outputted from the one-dimensional CNN processor, are mapped on a virtual spherical surface, as shown as the respective points (●, ▲, ■, etc.) drawn in FIG. 3B left, the distances among the characteristic value vectors of the respective data are not so large and thus the identification ability is not so high. Then, the characteristic value vectors are converted according to the first metric learning process such that the distances among the vectors having mutually different features will be increased as shown as the respective points drawn in FIG. 3B center; and further, according to the second metric learning processing, the characteristic value vectors are converted such that the distances among the vectors having mutually similar features are also increased as shown as the respective points drawn in FIG. 3B, right. Namely, it is considered that not only the distances among vectors having different features but also the distances among vectors having mutually similar features become larger, and thereby, the identification ability will also be improved with respect to the vectors having mutually similar features.

In this regard, the algorithm employed for the algorithm of the hierarchical metric learning may be chosen from arbitrary algorithms of deep metric learning, such as Ada-Cos, CosFace, ArcFace and SphereFace. According to the research of the inventor of the present embodiment, it has been found that very good identification accuracy can be achieved by employing AdaCos for the first metric learning process and CosFace for the second metric learning process.

Generation of Extended Data Based on Physics-Based Data Augmentation

In almost all cases, the numbers of the available existing data of known materials used for the learning of an identifier are small for the respective materials. For instance, with respect to the data of inorganic matters registered into ICSD, usually, only one or two of standard data is/are registered for each material. On the other hand, as noted, in actual measurements, various changes occur in measurement values, and therefore, in the measurement data, there can occur a shift of the variable, such as angle, frequency, etc., at which a peak appears (a shift of a peak position), variation of the intensity ratio of two or more peaks, disappearance of a peak, division of a peak, etc. in contrast to the existing data. Thus, when only one or two standard data registered in a database is/are used for each material for the data for the learning of an identifier, it becomes difficult to classify the data in which changes as described above have occurred with sufficient accuracy.

Then, in the present embodiment, preferably, data, obtained by artificially adding various changes which may occur in actual measurements to the existing data of known materials, are generated on a computer (Physics-based data augmentation process), and those generated data may be used for the data for learning in addition to the existing data of known materials (the original data). According to this structure, it is expected that, with respect to a certain material, its actually measured data having various changes different from the standard data of the material can also be identified and the kind of the material can be determined with high precision.

In the above-mentioned physics-based data augmentation process, concretely, processes which give various changes described in the following may be applied to the original data ($I(\theta)$ is the spectrum value at variable $\theta$, and $\theta_{pr}$, $\theta_{ps}$, etc. are variables giving a peak.).

(i) Peak shifting process (see (i) in FIG. 4)—The position of data to variable is shifted at random so that the variable at which a peak observed in an original data appears will be shifted.

$I(\theta) \rightarrow I(\theta \pm \Delta_r)$ [$\Delta_r$ is a random shift amount].

(ii) Peak intensity ratio changing process (see (ii) in FIG. 4)—The intensity ratio of two or more peaks observed in an original data is changed at random.

$I(\theta_{pr})$: $I(\theta_{ps}) = \alpha_r : \beta_r$ [$\alpha_r : \beta_r$ is an intensity ratio to be set at random.]

(iii) Peak erasing process (see (iii) in FIG. 4)—A peak observed in an original data is erased at random.

$I(\theta_{pr}) \to 0$ (iv) Peak dividing process (see (iv) in FIG. 4)—A peak observed in an original data is divided into two or more at random.

$I(\theta_{pr}) \to I(\theta_{pr1}) + I(\theta_{pr2})$

The degrees of the respective changes to be given in an original data may be set appropriately to be comparable to changes which can occur in actual measurements. In this regard, the above-mentioned processes giving changes may be performed to one existing data while being arbitrarily combined together. The data generated by the physics-based data augmentation process is referred to as "extended data."

The accuracy of identification or classification is more improved theoretically as the number of the above-mentioned extended data increases. However, since the change in the accuracy will be disappearing after the learning is performed with a certain volume of data, it becomes useless to continue the generation of newer extended data and the learning process therewith from that condition. Thus, in the learning process in the present embodiment, the cycle of generating new extended data and performing a learning process may be repetitively conducted, while the accuracy is being verified, until the change in the accuracy becomes hardly observed. In one-time learning cycle, several, such as five, of extended data may be generated for each existing data and be used for the data for learning in addition to the existing data. The number of the repeating of the cycle may be determined appropriately through experiments, etc.

EXPERIMENTAL EXAMPLES

In accordance with the teachings of the above-mentioned present embodiment, an identifier which identifies a kind of a material from its spectral data was prepared while using spectral data of 6800 kinds of materials containing lithium in the powder x-ray diffraction spectral data provided in ICSD provided by the National Institute of Standards and Technology, etc., and the validity of the present embodiment was verified by detecting its identification accuracy of a kind of a material. In this regard, the following experimental examples illustrate the validity of the present embodiment, and it should be understood that those do not limit the scope of the present invention.

In the structure of the identifier in the experiment, for the spectral data, the data in the range of 0°-120° of 2θ were used, and the spectral intensity value for every 0.02° was inputted to each neuron of the input layer consisting of 6000 neurons in the one-dimensional CNN processor. For the algorithm of one-dimensional CNN, 1D-RegNet as mentioned above was used. The dimensions of the characteristic value vector outputted from the one-dimensional CNN processor was 1024. The metric learning processor was configured to perform a hierarchical metric learning where, first, the algorithm of AdaCos was executed and then the algorithm of CosFace was executed. In the AdaCos, a 1024-dimensional vector was inputted and outputted in both the input sides and the output side, respectively, and in CosFace, the 1024-dimensional vector was received and the logits of 6800 classes were outputted. The calculation of the probability of each class was performed using the softmax function from the logit of CosFace.

For the data for learning, the existing data of each material obtained from ICSD, and the extended data generated from the existing data through the above-mentioned physics-based data augmentation process were used. In every one learning cycle, five extended data were generated and used for the data for learning. In this regard, each extended data was generated by executing all the processes of giving the above-mentioned four changes. And, in the data for learning, 70% of them were used for training data; 15% of them were used for verification data; and 15% of them were used for test data. The training data were used for updating the weight parameters by a backpropagation method; the verification data were used for the verification of the versatility of the learned model and adjustment of hyper-parameters; and the test data were used for the detection of the identification accuracy. The learning cycle was carried out for 150 epochs. The extended data were changed in every epoch.

In the results of the above-mentioned calculation experiment, the resultant identification accuracy are as follows:

TABLE 1

| Physics-based data augmentation | Metric learning process | Identification Accuracy (%) (Top1) |
| --- | --- | --- |
| Yes | AdaCos + CosFace | 94.15 |
| No | AdaCos + CoSFace | 72.21 |
| Yes | No | 68.22 |

Identification accuracy (Top1) is the rate of that the kind of the material of the class which gave the maximum probability was the correct answer. As understood from Table 1 it can be understood that the accuracies were improved in both of the case where the metric learning process was done by the hierarchical metric learning and the case where the extended data obtained by the physics-based data augmentation process were used as compared with the cases where those processes were not performed. In the case that the hierarchical metric learning and the physics-based data augmentation were simultaneously applied, surprisingly, the identification of a kind of a material was attained with high precision exceeding 94%.

Next, it was investigated whether the data having a change from a standard data could be identified. The algorithm of the hierarchical metric learning was applied for the identifier, and in the learning process, the data for learning including the extended data obtained through the physics-based data augmentation were used. Then, using data obtained by performing, to the existing data, only the peak shifting process; only the peak intensity ratio change process; only the peak erasing process; and only the peak dividing process, the identification accuracies were detected. The results are as follows:

TABLE 2

|  | Peak Shifting | Intensity Ratio Change | Peak Eracing | Peak Dividing |
| --- | --- | --- | --- | --- |
| Accuracy (%) Top1 | 89.32 | 93.77 | 92.75 | 94.15 |
| Accuracy (%) Top5 | 96.21 | 98.43 | 98.10 | 98.46 |

Accuracy (%) Top1 is the rate of that the kind of the material of the class which gave the maximum probability was the correct answer, and Accuracy (%) Top5 is the rate of that the material of a correct answer was in classes of which the probability was within the 5th highest from the top. As understood from Table 2, it is understood that the identification is possible with the accuracy exceeding 90% or more even when any of changes occurs in the data.

Thus, according to the above-mentioned present embodiment, it becomes possible to achieve the identification of a kind of a material from a spectral data of the material with better accuracy and promptly as compared with the prior art.

Although the above explanation has been described with respect to embodiments of the present invention, it will be apparent for those skilled in the art that various modifications and changes are possible, and that the present invention is not limited to the above-illustrated embodiments and may be applied to various devices and apparatus without deviating from the concepts of the present invention.

The invention claimed is:

1. A system of identifying a kind of a material from a spectral data of the material, comprising:
one-dimensional CNN processor, having a data input layer into which the spectral data of the material is inputted and a vector output layer which outputs a characteristic value vector of a predetermined number of dimensions, which processor is inputted with the spectral data at data input layer and then outputs at the vector output layer the characteristic value vector, corresponding to the spectral data, which is obtained by calculation based on the spectral data by a one dimensional convolution neural network algorithm; and
a metric learning processor, having a vector input layer into which the characteristic value vector is inputted and a probability output layer which outputs probabilities of kinds of various materials, which processor is inputted with the characteristic value vector at the vector input layer and then calculates, based on the characteristic value vector by a deep metric learning algorithm, the probabilities of the kinds of the various materials that the kind of the material of the spectral data corresponding to the characteristic value vector is each of the kinds of the various materials, and outputs the probabilities at the probability output layer;
wherein, using spectral data of two or more known materials of which kinds are known as data for learning, the one-dimensional CNN processor and the metric learning processor learn such that, when each of the data for learning is inputted into the data input layer of the one-dimensional CNN processor, a probability of the kind of the material of the inputted data for learning at the probability output layer of the metric learning processor becomes a maximum value of the probabilities; and
wherein a kind of a material for which the maximum probability value is obtained at the probability output layer of the metric learning processor when a spectral data of an arbitrary material is inputted into the data input layer of the one-dimensional CNN processor, is identified to be the kind of the arbitrary material.

2. The system of claim 1, wherein the metric learning processor computes the probability of each kind in the kinds of the various materials based on the characteristic value vector by a hierarchical metric learning algorithm executing the deep metric learning algorithm twice in succession.

3. The system of claim 2, wherein the algorithms executed twice in succession in the hierarchical metric learning algorithm are AdaCos and CosFace, and wherein, in the metric learning processor, the characteristic value vector is converted into logits of the AdaCos according to an algorithm of the AdaCos; the logits of the AdaCos are converted into logits of the CosFace according to an algorithm of the CosFace; and the probability of each kind in the kinds of the various materials is computed from the logits of the CosFace.

4. The system of claim 2, wherein the algorithms executed twice in succession in the hierarchical metric learning algorithm are chosen from AdaCos, CosFace, ArcFace, and SphereFace.

5. The system of claim 1, wherein the data for learning comprise spectral data of known materials and extended spectral data generated from the spectral data of the known materials according to an algorithm of physics-based data augmentation, and the algorithm of the physics-based data augmentation is an algorithm generates the extended spectral data by applying to the spectral data of the known materials a peak shifting process, a peak intensity ratio changing process, a peak erasing process, a peak dividing process or a combination of at least two of those processes to change the spectral data of the known materials.

6. The system of claim 5, wherein the extended spectral data are generated by performing all of the peak shifting process, the peak intensity ratio changing process, the peak erasing process, the peak dividing process in the algorithm of the physics-based data augmentation.

7. The system of claim 5, wherein the one-dimensional CNN processor and the metric learning processor are configured by repetitively performing generation of different extended spectral data according to the algorithm of the physics-based data augmentation and the learning process of the one-dimensional CNN processor and the metric learning processor using the different extended spectral data for the data for learning until an identification accuracy of the kind of the arbitrary material reaches a predetermined value.

8. The system of claim 1, wherein the one dimensional convolution neural network algorithm is an algorithm of 1D-RegNet.

* * * * *